(12) United States Patent
Haas et al.

(10) Patent No.: US 10,046,608 B2
(45) Date of Patent: Aug. 14, 2018

(54) METHOD AND ARRANGEMENT FOR LOCATING THE INSTALLATION POSITION OF WHEELS IN A MOTOR VEHICLE

(71) Applicant: CONTINENTAL AUTOMOTIVE GMBH, Hannover (DE)

(72) Inventors: Thomas Haas, Donaustauf (DE); Frank Fischer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/029,690

(22) PCT Filed: Sep. 30, 2014

(86) PCT No.: PCT/EP2014/070933
§ 371 (c)(1),
(2) Date: Apr. 15, 2016

(87) PCT Pub. No.: WO2015/055424
PCT Pub. Date: Apr. 23, 2015

(65) Prior Publication Data
US 2016/0263951 A1    Sep. 15, 2016

(30) Foreign Application Priority Data

Oct. 15, 2013    (DE) .................. 10 2013 220 873

(51) Int. Cl.
*G06F 17/10*    (2006.01)
*B60C 23/04*    (2006.01)

(52) U.S. Cl.
CPC ...... *B60C 23/0416* (2013.01); *B60C 23/0437* (2013.01); *B60C 23/0488* (2013.01); *B60C 23/0489* (2013.01)

(58) Field of Classification Search
CPC ............ B60C 23/0416; B60C 23/0437; B60C 23/0488; B60C 23/0489
See application file for complete search history.

(56) References Cited

U.S. PATENT DOCUMENTS 6,112,587 A * 9/2000 Oldenettel .......... B60C 23/0416
340/445
7,230,525 B2 6/2007 Hirai
(Continued)

FOREIGN PATENT DOCUMENTS

CN    101754886 A    6/2010
DE    19734323 B4    5/2004
(Continued)

*Primary Examiner* — Ian Jen
(74) *Attorney, Agent, or Firm* — Laurence A. Greenberg; Werner H. Stemer; Ralph E. Locher

(57) ABSTRACT

A method for localizing the installation position of wheels in a motor vehicle having at least a first, second and third wheels, includes allocating respective wheel electronics to the wheels for emitting a radio signal with an identifier and allocating at least one vehicle-side rotational angle sensor to at least a first possible installation position. The installation position of the first wheel is determined by output signals of the rotational angle sensor at a first possible installation position. In addition, the installation position of the second and third wheels is determined by measuring the field strength of radio signals with identifiers of the wheel electronics of the second and third wheels by using a vehicle-side receiving device. In this way, precise determination of the location of the wheel electronics can be performed with minimum expenditure on devices, without having to provide a rotational angle sensor on each wheel.

11 Claims, 4 Drawing Sheets

(56) References Cited

U.S. PATENT DOCUMENTS

| | | | |
|---|---|---|---|
| 7,636,035 B2* | 12/2009 | Pretzlaff | B60C 23/0416 340/425.5 |
| 8,204,645 B2* | 6/2012 | Weston | B60C 23/009 701/29.1 |
| 2003/0020604 A1* | 1/2003 | Fischer | B60C 23/0416 340/442 |
| 2005/0109092 A1* | 5/2005 | Martinez Marrufo | B60C 23/0416 73/146 |
| 2006/0012469 A1* | 1/2006 | Hirai | B60C 23/0416 340/445 |
| 2012/0259507 A1* | 10/2012 | Fink | B60C 23/0416 701/32.7 |

FOREIGN PATENT DOCUMENTS

| | | |
|---|---|---|
| DE | 10342297 A1 | 4/2005 |
| DE | 102004053696 A1 | 5/2006 |
| DE | 102009059788 A1 | 6/2011 |
| EP | 1052119 A1 | 11/2000 |
| EP | 1616723 A1 | 1/2006 |

* cited by examiner

METHOD AND ARRANGEMENT FOR LOCATING THE INSTALLATION POSITION OF WHEELS IN A MOTOR VEHICLE

BACKGROUND OF THE INVENTION

Field of the Invention

The present invention relates to a method and an arrangement for localizing the installation position of wheels or vehicle wheels in a motor vehicle, and to a control device, a motor vehicle with a corresponding arrangement for the localization and a computer program product.

The tire pressure of a vehicle wheel is subject to specific changes due to a wide variety of causes, for example the ambient pressure of the wheel, temperature, age of the wheel, etc. In this context, it has been established that an incorrectly set tire pressure represents a major factor in road traffic accidents. Since vehicle safety and reliability are central factors in the automotive sector, tire pressure must be checked regularly for safety reasons alone. For these reasons, inter alia, modern vehicles have tire information devices such as tire pressure monitoring systems. These tire information devices have wheel electronic systems installed in the vehicle wheel which measure wheel-specific measured values of different measured quantities (for example tire pressure, tire temperature, tire load, etc.) and transmit information derived therefrom to a vehicle-side receiving device. Tire information devices typically use electronic wheel units allocated to each vehicle wheel which transmit the data determined on the vehicle wheels by means of high-frequency transmit signals to a vehicle-side central evaluation device.

Any device which determines wheel-specific information and conditions via which the fault conditions possibly occurring on the vehicle wheel can be detected can be understood as an electronic wheel unit, which is referred to below as a vehicle electronic system for short. The term fault condition is to be interpreted broadly in the present context and encompasses all conditions, characteristics and information of a respective wheel which can be regarded as worthy of detection.

In this context, however, a problem exists in performing an automatic and unique allocation of a received transmit signal to the initially unknown wheel position of the transmitter, i.e. the wheel electronic system. A wheel electronic system can also transmit a unique individual identifier for this wheel electronic system in the transmitted transmit signal or radio signal. However, the position on the vehicle at which this vehicle wheel is actually fitted, i.e. installed, is not yet known therewith. In addition to the actual detection of a fault condition, the installation position of the individual vehicle wheels in relation to the vehicle is therefore also determined in modern tire information devices or tire information systems. This is also referred to as localization in the relevant literature.

For example, a method for localizing vehicle wheels is known from document DE 197 34 323 B4, in which each wheel has its own tire pressure monitoring device which in each case emits radio signals with corresponding tire characteristics and an individual identifier at time intervals to a central unit. A rotational angle sensor or rotational speed sensor for an anti-lock braking system (ABS) is furthermore allocated to each wheel. The angular offset of the wheel of a motor vehicle can be measured using rotation sensors in the wheel electronic system at two specified times. From the signals of the ABS rotational speed sensors, the wheel of the vehicle on which the corresponding angular offset occurs is then identified and a corresponding allocation or localization is performed. This method, which is also known as LSE (Localization with Synchronized Emissions), allows a reliable localization of the individual vehicle wheels, but it is expensive or complex, since an ABS rotational speed sensor must be provided for each wheel or, in the case of a commercial vehicle, such as a truck, in each wheel group or on each wheel axle of the vehicle.

BRIEF SUMMARY OF THE INVENTION

The object of the present invention therefore consists in producing a technically minimized facility for the reliable localization of vehicle wheels.

This object is achieved by the subject-matter of the independent claims. Advantageous designs are the subject-matter of the subclaims.

According to a first aspect of the invention, a method is devised for localizing the installation position of wheels or vehicle wheels in a vehicle, wherein the motor vehicle has at least one first wheel and at least one second and third wheel and a respective wheel electronic system is allocated to said wheels to emit a radio signal with an individual identifier, and furthermore at least one vehicle-side rotational angle sensor is allocated in at least one first possible installation position of a wheel on the vehicle. In the method, the installation position of the at least one first wheel is defined via output signals of the at least one sensor for the anti-lock braking system in the at least one first possible installation position. This means that, after it is then known which wheel with which individual identifier has been installed in the at least one first possible installation position, the individual identifier of this wheel, here the at least one first wheel, can be allocated to the at least one first possible installation position (of the at least one sensor for the anti-lock braking system). Furthermore, the installation position of the at least one second and third wheel is determined by measuring the field strength of the radio signals with the individual identifiers of the wheel electronic systems of the at least one second and third wheel by means of a vehicle-side receiving device. The fact that the measured field strength serves as a measure of the distance from the vehicle-side receiving device to the respective wheel electronic system of the at least one second and third wheel can be exploited, thus allowing the respective installation position to be inferred. It is then possible for the individual identifier of the at least one second and third wheel to be allocated to a second possible and third possible installation position according to the respectively measured field strength. In this way, the method according to the invention utilizes the transmitted radio signals of the wheel electronic systems that are present in any case in order to carry out a localization of one part of the vehicle wheels using a field strength measurement of these signals, while another part of the wheels can be localized by means of the at least one vehicle-side rotational angle sensor. In this way, it is not necessary to provide a rotational angle sensor for each wheel for the localization, as a result of which the technical expenditure is minimized, but a reliable facility for automatic localization of the installation position of vehicle wheels continues to be provided.

According to one design of the method, the individual identifier of the wheel is initially defined at the first possible installation position, i.e. the position of the rotational angle sensor, whereas, for the not yet localized wheels, the installation position is then determined by means of field strength measurement. This means that it is first determined which wheel with which individual identifier is installed at the installation position of the sensor for the anti-lock braking system, wherein the wheel identifiers whose allocated wheels are not yet localized are then still remaining. The number of individual identifiers for which a field strength measurement is to be carried out with the corresponding transmitted radio signals is thus reduced, as a result of which the localization can be carried out via the field strength measurement, on the one hand more quickly and, on the other hand, more reliably.

According to a further design of the method, the vehicle-side receiving device is arranged asymmetrically in terms of distance in relation to the at least one second and third wheel. This means that the distance from the vehicle-side receiving device for receiving the radio signals emitted by the wheel electronic system to one of the wheels, for example the at least one second wheel is shorter, whereas it is longer to the other wheel, for example the at least one third wheel. In this way, a distinction can be made in respect of the installation position for a wheel at which the vehicle-side receiving device is closer, since the field strength of the received radio signals of the corresponding wheel electronic system then has a higher value there.

In particular, the accuracy of the localization is further improved by means of field strength measurement in relation to the asymmetrical arrangement, in that a radio signal is emitted by a respective wheel electronic system with a predefined transmitting power. All radio signals are advantageously emitted with the same transmitting power. In this way, it can be ensured that, on the one hand, with the same transmitting power and, on the other hand, with an asymmetrical arrangement of the vehicle-side receiving device, the measured field strength can serve as a measure of the distance from the vehicle-side receiving device to the wheel electronic systems in order to enable the respective installation position of a wheel to be reliably inferred.

According to one design, the at least one first wheel is arranged on a first wheel axle of the motor vehicle and the at least one second and third wheel are arranged on a second wheel axle of the motor vehicle. The motor vehicle may be a passenger vehicle or a commercial vehicle, such as, for example, a truck with a plurality of axles. Trucks, in particular, may have more than two wheel axles, wherein sensors for an anti-lock braking system are not provided on each wheel axle. The method according to the invention thus enables a simple and reliable facility for localizing the installed wheels, even for commercial vehicles of this type.

According to one design, the rotational angle sensor can be implemented by means of a rotational speed sensor, wherein the rotational speed sensor is designed, in particular, as an ESP rotational speed sensor or an ABS rotational speed sensor.

The installation position can be defined by means of the at least one rotational angle sensor in such a way that a first rotational angle position of the wheel allocated to a wheel electronic system is defined at least on the wheel side. A radio signal is furthermore then emitted (in addition to the individual identifier of the wheel electronic system) with first rotational angle information depending on the determined first rotational angle position. Second rotational angle positions of the at least one wheel are furthermore defined on the vehicle side in the at least one first possible installation position, and second rotational angle information is made available depending thereon. Finally, the first rotational angle information is synchronized with the second rotational angle information in order to localize from it the wheel installed in at least a first possible installation position. The localization is therefore carried out according to this design by means of a comparison of the rotational angle information supplied on the wheel side with the rotational angle information determined on the vehicle side according to the above-mentioned LSE method. In this way, a reliable facility is provided for defining which wheel is located or installed in the at least one first possible installation position, i.e. in the at least one vehicle-side sensor of the anti-lock braking system.

According to a further aspect of the invention, an arrangement is provided for localizing the installation position of wheels in a motor vehicle. The arrangement comprises at least one vehicle-side rotational angle sensor for the arrangement in at least one first possible installation position. The arrangement furthermore comprises wheel electronic systems which are allocated to at least one first and at least one second and third wheel and are configured to emit a radio signal with an individual identifier for a corresponding wheel electronic system. A vehicle-side receiving device is furthermore provided for receiving the radio signals. Finally, the arrangement comprises a vehicle-side evaluation device which is configured to define the installation position of the at least one first wheel via output signals of the at least one rotational angle sensor in the at least one first possible installation position. It can then allocate the individual identifier of the one first wheel to the installation position of the at least one first sensor for the anti-lock braking system. The evaluation device is furthermore configured to determine the installation position of the at least one second and third wheel by measuring the field strength of the radio signals with the individual identifiers of the wheel electronic systems of the at least one second and third wheel at the location of the vehicle-side receiving device. The respectively measured field strength can again serve as a measure of the distance from the vehicle-side receiving device to the wheel electronic system of the second and third wheel and enable the respective installation position thereof to be inferred. The individual identifier of the at least one second and third wheel can then be allocated to a second possible and third possible installation position according to the respectively measured field strength.

According to one design of the arrangement, the vehicle-side receiving device is designed to be arranged asymmetrically in terms of the distance to the at least one second and third wheel. Particularly in the case of wheel electronic systems which emit their radio signals with the same transmitting power, the measured field strength can then serve as a measure of the distance from the vehicle-side receiving device to a corresponding wheel electronic system, and a reliable determination of the installation position of the wheel electronic system can be carried out.

According to a further design, the evaluation device has a memory for storing all individual identifiers received via the radio signals and a corresponding allocation to the possible installation positions of the allocated wheels. The evaluation device can be configured in such a way that, following allocation of the individual identifier of the at least one first wheel to the at least one first possible installation position of the at least one rotational angle sensor, it determines the installation position of the at least one second and third wheel by measuring the field strength of the radio signals with the individual identifiers of the wheel electronic systems of the at least one second and third wheel by means of a vehicle-side receiving device. This again means that, if the installation position is known in the memory of the evaluation device for the individual identifier of the at least one first wheel, said identifier can be ignored by the evaluation device for the following definition of the allocation of the at least one second and third wheel in order to thus speed up and increase the reliability of the measurement of the installation position of the second and third wheel.

According to a further aspect of the invention, a control device is provided for the arrangement for localizing the installation position of wheels in a motor vehicle. The control device has a first input for receiving the output signals of at least one vehicle-side rotational angle sensor which is arranged in at least a first possible installation position on the motor vehicle. The control device furthermore has a second input for receiving radio signals which are emitted with an individual identifier by wheel electronic systems which are allocated in each case to at least one first and at least one second and third wheel. It furthermore has a vehicle-side evaluation device which is configured to define the installation position of the at least one first wheel via output signals of the rotational angle sensor at the first possible installation position, and is configured to determine the installation position of the at least one second and third wheel by measuring the field strength of the radio signals with the individual identifiers of the wheel electronic systems of the at least one second and third wheel at the location of the vehicle-side receiving device, wherein the respectively measured received field strength can serve as a measure of the distance from the vehicle-side receiving device to the wheel electronic system of the at least one second and third wheel and allows the respective installation position to be inferred. In this way, the control device allows a localization of the installation position of wheels with high reliability and with minimized technical outlay, since additional signals from rotational angle sensors do not need to be provided for each wheel for the localization.

According to a further aspect of the invention, a motor vehicle is provided. Said vehicle has at least one first and at least one second and third wheel. It furthermore has an arrangement for localizing the installation position of the wheels in the motor vehicle according to an illustration or design hereof explained above.

Advantageous designs of the method, insofar as they are transferable to the arrangement and the control device, are to be regarded as advantageous designs of the arrangement and the control device, and vice versa.

According to a further aspect of the invention, a computer program product is indicated which is designed to carry out a method as described above and below, if it is executed on a control device as described above and below.

The computer program product offers the advantages already specified in connection with the corresponding embodiments of the method according to the invention of the control device according to the invention, which will not be described again at this point in order to avoid repetitions.

BRIEF DESCRIPTION OF THE SEVERAL VIEWS OF THE DRAWING

Example embodiments of the present invention will now be explained in detail below with reference to the attached drawings, in which.

DESCRIPTION OF THE INVENTION

In the figures, identical and functionally identical elements are denoted in each case with the same reference numbers, unless otherwise indicated.

Figure 1:
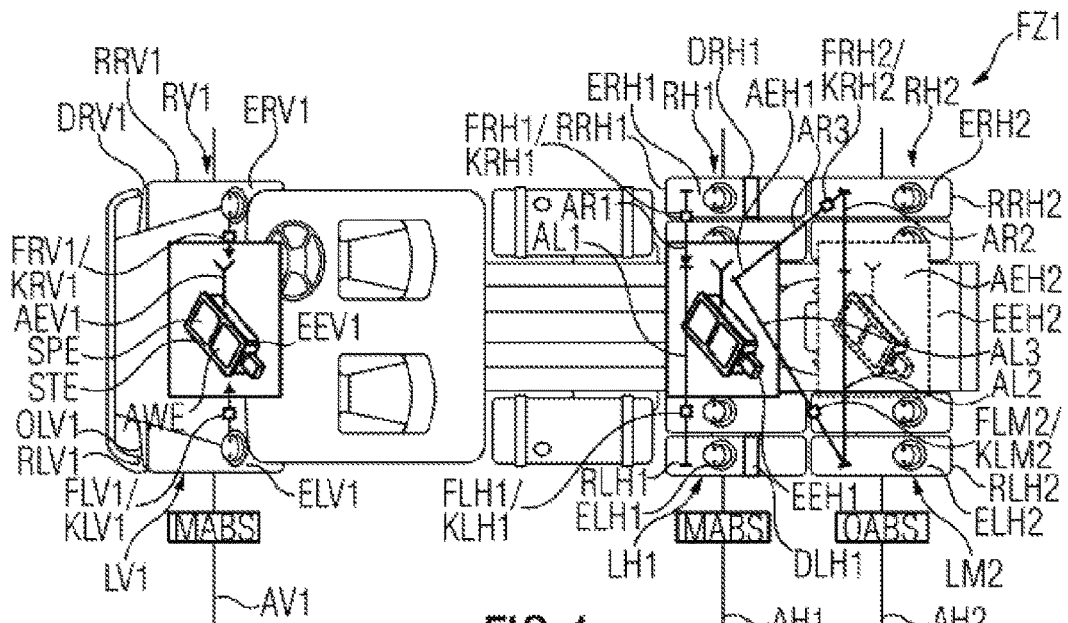
FIG. 1 shows a schematic representation of a motor vehicle in the form of a truck with an arrangement for localizing the installation position of wheels according to a first embodiment of the invention.

Reference will first be made to FIG. 1, which shows a schematic representation of a vehicle FZ1 in the form of a truck which has a first tire information device or tire pressure monitoring device and a tire pressure monitoring system (RDKS) which is also referred to as a TPMS (Tire Pressure Monitoring System) according to a first embodiment. The truck FZ1 comprises three wheel axles, a front axle AV1 and a first rear wheel axle AH1 and a second rear wheel axle AH2. A left wheel or vehicle wheel RLV1 is provided on the front wheel axle AV1 at an installation position LV1 and a right wheel RRV1 is provided at an installation position RV1. A left wheel RLH1 is provided on the first rear wheel axle at an installation position LH1, and a right wheel RRH1 is provided at an installation position RH1, while a left wheel RLH2 is provided on the second rear axle AH2 at an installation position LH2 and a right wheel RRH2 is provided at an installation position RH2. It should be noted that, for reasons of simpler explanation of the invention, only the outer wheels of the rear wheel axles are described in more precise detail with regard to their characteristics and mode of operation for the description of the invention. However, it is also conceivable for the respective inner wheels to have functions corresponding to those of the outer wheels.

A wheel electronic system is allocated to each of said vehicle wheels. The wheel electronic system is also referred to as a Wheel Unit (WU). In more precise terms, a wheel electronic system can be installed in a corresponding vehicle wheel, for example on an inner surface of the tire located opposite a tread of a tire of the vehicle wheel or on a tire valve (this applies not only to the wheel electronic systems shown in FIG. 1, but also to the wheel electronic system shown in the following FIGS. 2 to 5). The wheel electronic system ELV1 is thus allocated to the left front wheel RLV1, while the wheel electronic system ERV1 is allocated to the right front wheel RRV1.

The electronic system ELH1 is allocated to the left first rear wheel RLH1, while the wheel electronic system ERH1 is allocated to the right first rear wheel RRH1. And finally, the wheel electronic system ELH2 is allocated to the left second rear wheel RLH2, while the wheel electronic system ERH2 is allocated to the right second rear wheel RRH2. A control device STE, which, along with an evaluation device AWE, furthermore has a receiving device EEV1 which comprises an antenna AEV1 for receiving radio signals is furthermore arranged in the front area of the vehicle. The receiving device EEV1 is capable of receiving radio signals FLV1 with an individual identifier KLV1 of the wheel electronic system ELV1, wherein it is furthermore capable of receiving radio signals FRV1 with an individual identifier KRV1 of the wheel electronic system ERV1. A communication connection is thus established between the wheel electronic systems ELV1 and ERV1 and the control device STE. In more precise terms, the control device STE may have a first input via which information is supplied to it from the receiving device EEV1 (or other receiving devices mentioned later), and may have a second input via which output signals or information from rotational angle sensors or rotational speed sensors is provided to it.

A receiving device EEH1 which is connected to the control device STE and its evaluation device AWE is provided in the rear part of the vehicle, wherein the receiving device EEH1 is capable of receiving radio signals FLH1 with an individual identifier KLH1 of the wheel electronic system ELH1, and also radio signals FRH1 with an individual identifier KRH1 of the wheel electronic system ERH1. The receiving device EEH1 can furthermore also receive radio signals FLH2 with an individual identifier KLH2 of the wheel electronic system FLH2, and also radio signals FRH2 with an individual identifier KRH2 of the wheel electronic system FRH2. Optionally, it is also conceivable that the radio signals FLH2 and FRH2 of the wheel electronic system and the rear wheel axle AH2 can also be received by an optional second rear receiving device EEH2 with an antenna AEH2.

The wheel electronic systems and the receiving units on the vehicle side as a whole form part of a tire information device which additionally has the control device STE as a central control device. This tire information device is also designed to perform a localization of the different aforementioned vehicle wheels. As just mentioned, the control device has an evaluation device AWE which has, for example, a microcontroller or microprocessor as a program-controlled device, and also a memory device SPE.

Reference will now be made to the left part of FIG. 1 to explain the localization of the installation position of the front vehicle wheels. A tire information device consisting of the components just mentioned, i.e. the control device STE with its receiving device EEV1, and also the wheel electronic systems ELV1 and ERV1 allocated to the front wheels is used to localize the vehicle wheels. The tire information device is furthermore also extended for the localization of the front wheels with vehicle-side rotational angle sensors, in particular rotational speed sensors, which are arranged in each case on the vehicle side at possible installation positions for a vehicle wheel. A vehicle-side rotational angle sensor DLV1 is provided at the installation position of a left front wheel, while a vehicle-side rotational angle sensor DRV1 is provided on a front right installation position for a vehicle wheel. These vehicle-side rotational angle sensors DLV1 and DRV1 may be sensors for a driving stability control system, such as an ABS system or ESP (electronic stabilization system). In particular, these sensors are connected to the stability control system which is in turn connected to the evaluation device AWE of the control device STE for the tire information device. The connection between the stability control system and the evaluation device AWE may be designed, for example, as an internal vehicle-side communication bus.

Figure 6:
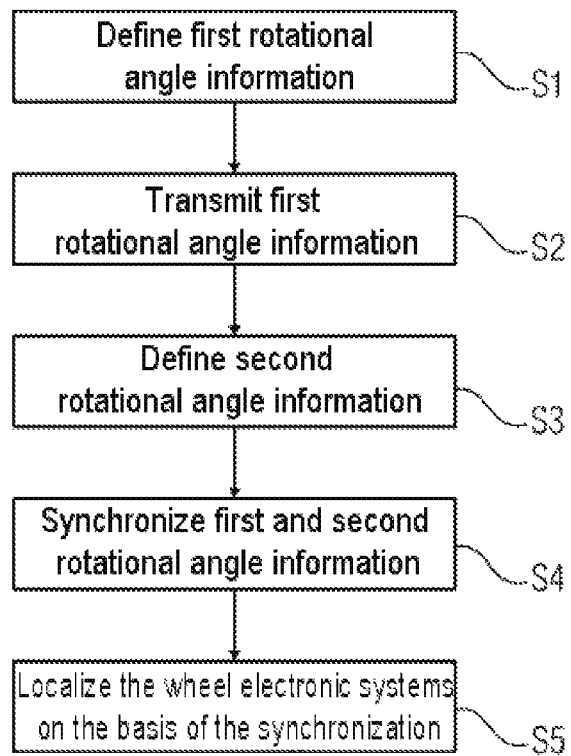
FIG. 6 shows a flow diagram illustrating the basic sequence of the localization of wheels according to one embodiment of the invention.

FIG. 6 shows a flow diagram illustrating the method for localizing the installation position of the front vehicle wheels. In a method step S1, a first rotational angle position of the vehicle wheel (for example the wheel RLV1) allocated to this wheel electronic system (for example the wheel electronic system ELV1) is defined on the wheel electronic system side. In the following step S2, a transmit signal or radio signal FLV1 is first supplied or emitted by the wheel electronic system, said transmit signal having, in addition to its individual identifier KLV1, this predefined rotational angle position or first rotational angle information dependent thereon. In addition, the transmit signal FLV1 may also contain further information, for example wheel-specific information, such as, for example, the tire pressure or tire temperature. This transmit signal supplied in this way is then transmitted via a transmitting device (not shown) on the wheel electronic system side. The transmit signal transmitted in this way is received on the vehicle side by the receiving device EEV1 of the control device STE. In step S3, second rotational angle positions of the vehicle wheels are defined on the vehicle side, wherein not only the rotational angle position of the vehicle wheel which is allocated to the wheel electronic system ELV1 emitting the transmit signal FLV1, but also the rotational angle position of the other vehicle wheel RRV1 is defined here. A number of second rotational angle information elements typically corresponding to the number of vehicle wheels is thereby obtained. In a next step S4, the first and second rotational angle information elements obtained in this way are synchronized with one another and preferably compared with one another. In the concluding step S5, the installation position and therefore a localization of the vehicle wheel RLV1 allocated to the wheel electronic system ELV1 is defined depending on the synchronization performed. It can be assumed for the synchronization that the vehicle wheels present on a vehicle generally rotate at one or more or fewer different speeds. Moreover, it is assumed that the wheel electronic system is capable of determining a rotational angle position of the wheel electronic system in relation to the vehicle. This information is used if the wheel electronic system transmits a transmit signal (with a corresponding message) to the receiving device on the vehicle side. As well as wheel-specific information, the message of the transmit signal to be transmitted also has this rotational angle position or rotational angle information derived therefrom. It is not essential and in some instances also not advantageous for the wheel electronic system actually to know the precisely measured rotational angle position. It is only essential that the wheel electronic system and/or the vehicle-side evaluation device AWE can determine, from the measured rotational angle information, the rotational position at which the wheel electronic system transmits the transmit signal, for example using known calculation times, transmission durations, vehicle speeds and the like.

Finally, it is assumed that a rotational angle sensor or rotational speed sensor is provided on the vehicle side for each vehicle wheel to be localized via this method, for example as a component of an ABS system or ESP system. Rotational speed signal pulses (ticks) and, derived therefrom, the precise wheel angle position in relation to the vehicle can be determined by means of this rotational speed sensor. It is assumed that a wheel electronic system emits transmit signals multiple times. These transmit signals are always emitted by this wheel electronic system at precisely the same or at least a precisely known rotational angle position which can be determined by the wheel electronic system or can be calculated retrospectively by the evaluation device AWE. If this transmit signal is received on the vehicle side, the respective wheel position is determined on the vehicle side at the time of reception or at least at the time derived therefrom and from the transmit time, for example by means of the rotational angle sensor.

In the synchronization of the transmit times of the received transmit signals of the wheel electronic systems with the allocated angle settings, a fixed relationship between the transmit times of the radio transmissions of each combination of wheel electronic systems and rotational speed or rpm sensors belonging to the same vehicle wheel can be established over a considered evaluation period. In the message of its transmit signal, each wheel electronic system transmits a unique individual identifier which enables a vehicle-side identification of the respective wheel electronic systems.

In this way, it is possible to determine the installation position of the left front wheel RLV1 and the right front wheel RRV1 using the output signals of the rotational speed sensors DLV1 and DRV1 by synchronizing the rotational angle information of these sensors with rotational angle information from radio signals of the wheel electronic systems. In other words, it is possible in this way to define the which wheel with which individual identifier of the wheel electronic system ELV1 allocated to it is located at the left front installation position and which wheel with which individual identifier of its allocated wheel electronic system is located at the right front position.

As shown in FIG. 1, not only the wheels of the front axle AV1, but also the wheels of the first rear axle AH1 are equipped with rotational angle sensors or rotational speed sensors. A corresponding equipment with rotational speed sensors in the case of one axle is highlighted in the figures by the designation "MABS", whereas one axle without rotational angle sensors is designated "ORBS". More precisely, a rotational angle sensor DLH1 is provided at the position of the left tire RLH1 of the first rear axle AH1, whereas a rotational angle sensor DRH1 is provided at the installation position of the right wheel RRH1 of the rear axle AH1. It is thus possible via the front rotary axle AV1 that the wheels of the first rear rotary axle AH1 can also be localized using output signals of the rotational angle sensors DLH1 and DRH1. As in the case of the front axle AV1, first rotational angle information which is transmitted by means of signals FLH1 and FRH1 to the receiving device EEH1 can be compared with second rotational angle information from the rotational angle sensors DLH1 and DRH1 in the case of the first rear axle AH1 in order thus to be able to perform a localization of the wheels on the axle AH1. For a detailed description, reference is made to the explanation of the localization of the wheels on the first front axle AV1.

One challenge in the first embodiment of a tire information device according to FIG. 1 consists in that no rotational angle sensor is allocated to the wheels RLH2 and RRH2 of the second rear axle. However, in order to be able to perform a localization or allocation of the wheels to the individual installation positions here also, the fact is exploited that the communication of the individual wheel electronic systems is performed via radio signals with a receiving device, such as the receiving device EEH1 or its antenna AEH1. It is assumed that all wheel electronic systems, in particular those of the wheels of the rear axles, emit their radio signals or transmit signals with the same predefined signal transmitting power S0. It is furthermore assumed that the antenna AEH1 which receives the radio signals of the wheel electronic systems is arranged asymmetrically in terms of the distance to the wheels of one axle, wherein here, using the example from FIG. 1, the antenna is located more on the right side of the vehicle axle (higher up in the figure). In other words, the distance AR1 from the first right wheel RRH1 to the antenna AEH1 is shorter than the distance AL1 from the first left wheel RLH1 to the antenna AEH1. Furthermore, the distance AR3 from the second right wheel RRH2 to the antenna AEH1 is shorter than the distance AL3 from the second left wheel RLH2 to the antenna AEH1.

In an arrangement as shown in FIG. 1, all distances AR1, AR3, AL3 and AL1 are also different. Since a field strength of a radio signal emitted by the rear wheel electronic systems measured at the location of the antenna AEH1 serves as a measure of the distance of the wheel electronic systems from according to a distance of a respective wheel allocated to the wheel electronic systems to the antenna AEH1, it is possible to infer the possible location of the emitting wheel electronic system and therefore also the installation location of the allocated wheel by means of a field strength measurement or RSSI (Received Signal Strength Indicator) measurement of a radio signal.

As already mentioned, the control device STE comprises a memory SPE in which, on the one hand, all individual identifiers of the individual wheel electronic systems of the wheels installed on the vehicle FZ1 can be stored. The installation positions of the corresponding wheels can furthermore be stored for the individual identifiers of the wheel electronic systems. As explained above, the installation position on the front left side can thus be stored for the individual identifier KLV1 of the wheel electronic system ELV1, whereas, for the individual identifier KRV1 of the of the front right wheel electronic system ERV1, the installation location of the corresponding wheel on the front right position can be stored.

Figure 7:
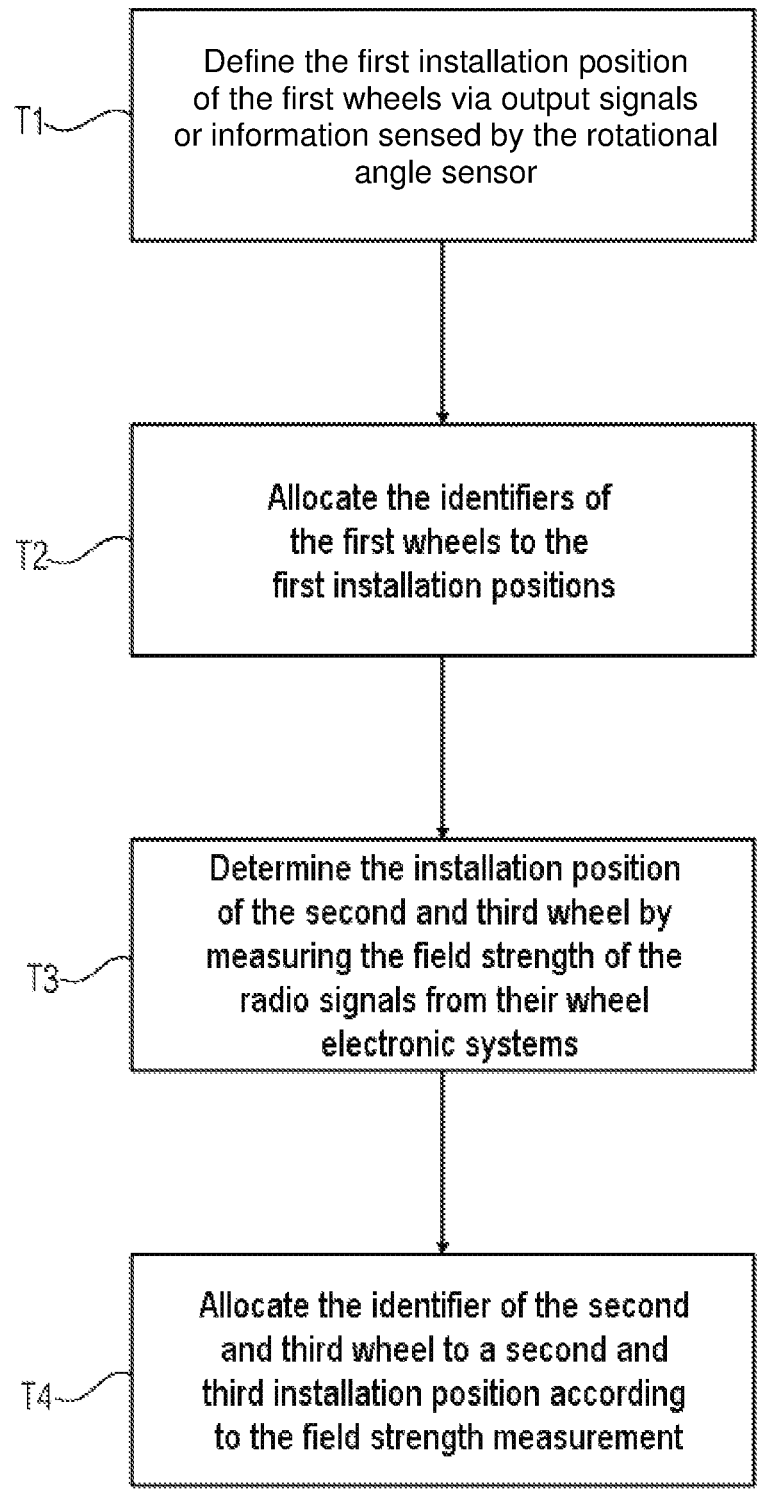
FIG. 7 shows a flow diagram illustrating a method for localizing the installation position of wheels in a vehicle according to one embodiment of the invention.

If the localization of the individual wheels on the rear axles is now considered, reference is made to FIG. 7. As already described above in relation to the front axle AV1, it is possible to define the installation position of the wheels of the first rear axle AH1 according to step T1, taking into account the information or output signals from the rotational angle sensors DLH1 and DRH1. According to step T2, the individual identifiers KLH1 and KRH1 of an installation position of the corresponding allocated wheel on the left on the first rear axle AH1 or on the right on the first rear axle AH1 can be allocated accordingly.

After the installation position of the wheels of the first rear axle AH1 has then been defined, of which the wheel electronic systems ELH1 and ERH1 are connected via the antenna AEH1 to the receiving device EEH1, it is then possible for the two still remaining identifiers KLH2 and KRH2 to define the installation position of the wheels allocated to these identifiers and not yet localized. This can finally be effected by means of a field strength definition of the radio signals FLH2 and FRH2 emitted by the wheel electronic systems ELH2 and ERH2. Since, as already mentioned, the antenna AEH1 is located more on the right side of the vehicle, the distance AR3 from the wheel electronic system ERH2 to the antenna AEH1 is shorter than the distance AL3 from the wheel electronic system ELH2 to the antenna AEH1. The receiving device EEH1 can then measure the field strength of the radio signals FRH2 and FLH2 via its antenna AEH1 according to step T3 and can either evaluate it itself or forward the measurement results to the evaluation device AWE in the control device STE. If it is established that the radio signal with the individual identifier KRH2 has a greater field strength than the radio signal FLH2 with the identifier KLH2, it can be concluded therefrom that the wheel electronic system ERH2 which has emitted the radio signal FRH2 is located closer to the antenna AEH1 than the wheel electronic system ELH2. Since only two different installation positions were still unoccupied in the storage device of the control device STE, the installation position of the allocated wheel RRH2 on the right of the second rear axle can be allocated according to step T4 for the individual identifier KRH2, whereas the installation position of the allocated wheel RLH2 on the left second rear axle is allocated for the identifier KLH2. A unique localization of the vehicle wheels of the vehicle FZ1 is thus possible with reduced device-related technical outlay, since no additional rotational speed sensors are required to determine the installation position of the wheels on the second rear axle.

According to one design of the localization of the wheels of the second rear axle AH2, it is also conceivable for the radio signals FLH2 and FRH2 of the wheel electronic systems ELH2 and ERH2 to be defined by means of a second receiving device EEH2 in the area of the second rear axle. In more precise terms, the signals are received by an antenna AEH2 which is allocated to the second receiving device EEH2 and is again also asymmetrical in terms of the distance from the antenna AEH2 to the left and right wheel electronic systems. In the example shown in FIG. 1, the distance AR2 from the right wheel electronic system ERH2 is shorter than the distance AL2 from the left wheel electronic system ELH2 to the antenna AEH2. It could thus also be established by means of a field strength measurement of the respective radio signals FLH2 and FRH2 by the antenna AEH2 whether a corresponding radio signal has been emitted by a right or left wheel electronic system, since, due to the shorter distance from the antenna AEH2 to the right wheel electronic system ERH2, the received field strength of a radio signal FRH2 is greater than the field strength of a received signal FLH2. An additional second receiving device EEH2 of this type on the second rear axle may be advantageous, for example, if the second rear axle is further distanced from the first rear axle AEH1 or from the first receiving device EEH1, or a reliable communication connection from the wheel electronic systems of the second rear axle to the first receiving device EEH1 is not established through corresponding structural measures on the vehicle FZ1.

According to a further design of the embodiment shown in FIG. 1, it is also conceivable for all wheels of the rear axle initially to be localized by means of field strength measurement of the respective signals of the allocated wheel electronic systems, and for the localization to be supported or confirmed by the definition of the installation position by means of the output signals of the rotational angle sensors DLH1 and DRH1.

Figure 2:
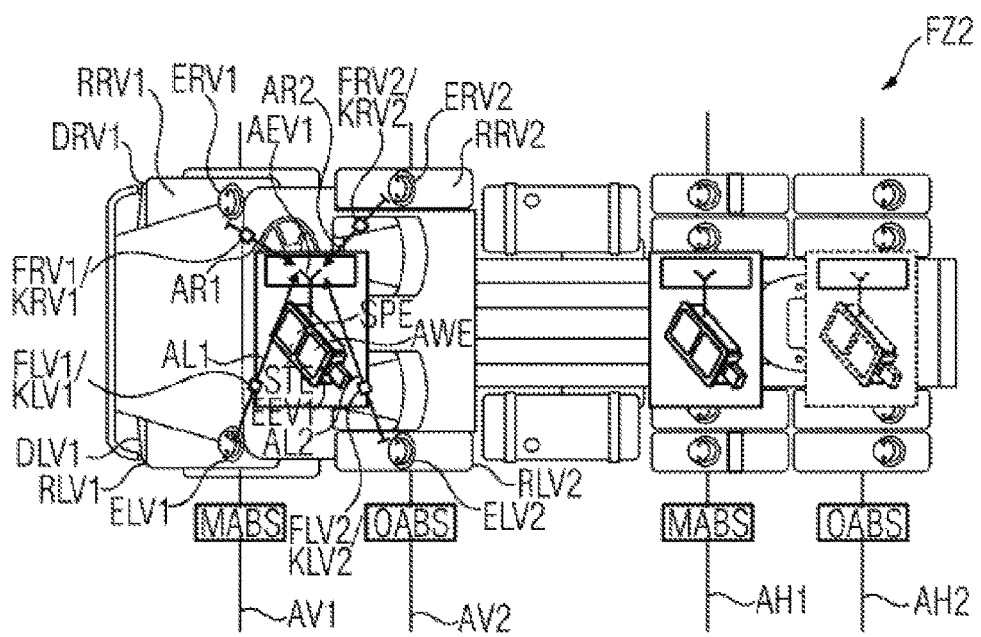
FIG. 2 shows a schematic representation of a motor vehicle in the form of a truck with an arrangement for localizing the installation position of wheels according to a second embodiment of the invention.

Reference is now made to FIG. 2, which shows a vehicle FZ2 in the form of a truck with a second embodiment of a tire pressure monitoring device or tire information device according to the invention. The set-up of the tire pressure monitoring device or tire pressure information device on the wheels of the rear axles AH1 and AH2 corresponds to the set-up of the tire information device of the vehicle FZ1 shown in FIG. 1 on the rear axles, so that no detailed explanation is given here, but reference is made instead in this respect to FIG. 1.

A characteristic of the vehicle FZ2 is now that, along with the first front axle AV1, it has a second (rear) front axle AV2. A wheel RLV2, for which a corresponding wheel electronic system ELV2 for emitting a radio signal FLV2 with an individual identifier KLV2 is provided on this second front axle on the left side. On the right side of the second front axle, a right wheel RRV2 with an allocated wheel electronic system ERV2 is provided in order to emit radio signals FRV2 with an individual identifier KRV2. As shown in FIG. 2, the antenna AEV1 of the receiving device EEV1 of the control device STE is arranged asymmetrically in relation to the middle vehicle longitudinal axle, i.e. in such a way that the antenna AEV1 has a shorter distance to the right wheel electronic systems ERV1 and ERV2 compared to the left wheel electronic systems ELV1 and ELV2. This means that the distance AR2 from the second right wheel electronic system ERV2 to the antenna AEV2 is shorter than the distance AL2 from the second left wheel electronic system ELV2 to the antenna AEV1.

In this way, provided that all front wheel electronic systems emit radio signals with the same predefined transmitting power S0, it is again possible to infer the distance to the wheel electronic system emitting a corresponding signal using a field strength measurement at the location of the antenna AEV1. As explained above in relation to the rear axles AH1 and AH2, the installation position of the wheels of the first front axle AV1 can initially be defined by means of output signals of the vehicle-side rotational angle sensors or rotational speed sensors and DLV1 and DRV1 and the corresponding allocation of the individual connections KLV1 and KRV2 to the installation position of the allocated wheels can be stored. It can then be determined, by means of field strength measurement of the radio signals FLV2 and FRV2 and according to the evaluation in the evaluation device AWE of the control device STE, which radio signals are emitted with a greater field strength, wherein the radio signals FRV2 of the right wheel electronic system ERV2 are measured with a greater field strength at the location of the antenna AEV1, since the distance from the right wheel electronic system ERV2 to the antenna AEV1 is shorter than the distance from the left wheel electronic system ELV2 to the antenna AEV1. In this way, the installation position of the wheels of the second front axle to which no rotational speed sensor is allocated can be inferred on the basis of field strength measurement. Thus, the device-related and method-related technical outlay in the definition of the wheel position is thus minimized through the use of two different definition methods, with no loss of accuracy in the localization. In particular, this type of localization using the combination of the aforementioned different definition methods is applicable to trucks with a number of three or more axles, since rotational angle sensors and rotational speed sensors are not normally provided here on each axle on the vehicle side.

According to one design of the localization from FIG. 2, it is again conceivable here also for all four wheels of the front axles to carry out a localization by means of field strength measurement, and then, for confirmation, additionally to carry out a measurement using the rotational angle sensors or rotational speed sensors DLV1 and DRV1.

Figure 3:
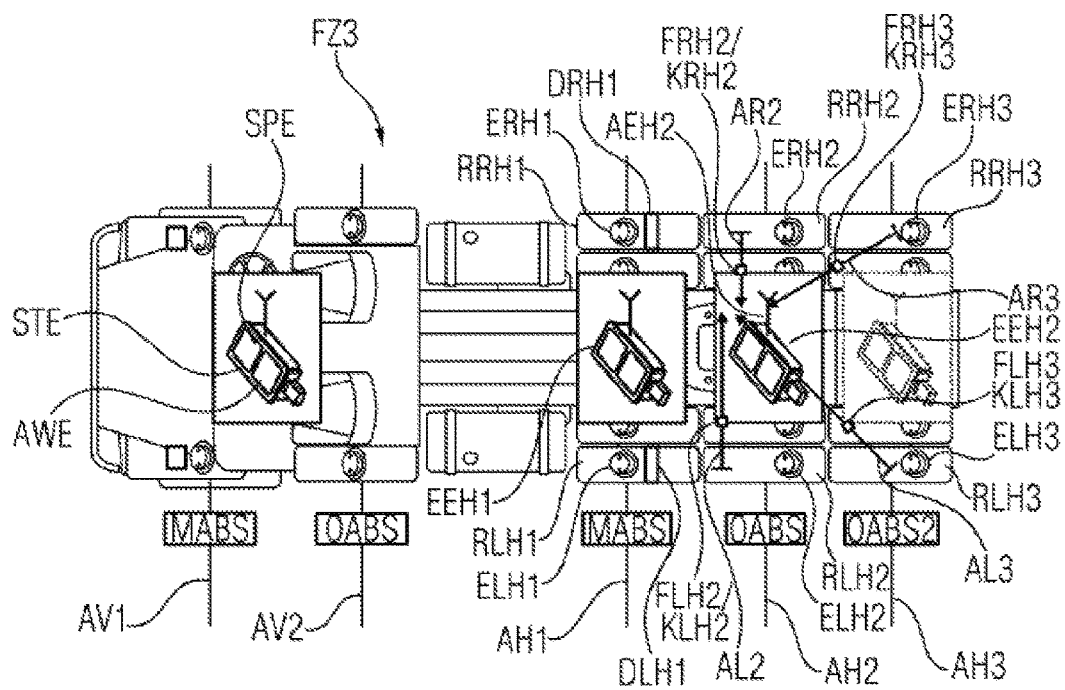
FIG. 3 shows a schematic representation of a motor vehicle in the form of a truck with an arrangement for localizing the installation position of wheels according to a third embodiment of the invention.

Reference will now be made to FIG. 3 which shows a vehicle FZ3 in the form of a truck with a tire information device according to a third embodiment of the invention. The configuration or design of the wheels of the first front axle AV1 and second front axle AV2 corresponds to the design of the two front axles from FIG. 2, and reference is therefore made here to FIG. 2 for a more precise explanation. Only the control device STE is adapted to carry out a localization and tire pressure monitoring for the newly added wheels of the third rear axle also.

If the right part of FIG. 3 is considered, in more precise terms the rear part of the vehicle FZ3, three rear axles AH1, AH2 and AH3 are now provided here, in contrast to the embodiment shown in FIGS. 1 and 2. It should be mentioned in this respect that the set-up of the first rear axle and the set-up of the second rear axle with the corresponding wheels, wheel units, rotational speed sensors and receiving units correspond to the set-up of the preceding embodiments. In particular, the first rear axle AH1 is again an axle with rotational angle sensors or rotational speed sensors, characterized by the term "MABS", wherein the second rear axle AH2 is an axle without rotational angle sensors or rotational speed sensors, characterized by the term "OABS". Finally, the third rear axle AH3 is an axle without rotational angle sensors or rotational speed sensors, characterized by the term "OABS2". The output signals of the vehicle-side rotational angle sensors or rotational speed sensors DLH1 and DRH1 can again be used to localize the wheels RLH1 and RRH1 of the first rear axle AH1 in order to carry out a synchronization of first rotational angle information of the wheel units ERH1 and ELH1 with second rotational angle information of the rotational speed sensors DRH1 and DLH1. The wheel units ERH1 and ELH1 can accordingly transmit radio signals with an individual identifier and first rotational angle information to the first receiving device EEH1.

However, in order to carry out the localization of the wheels of both rear axles AH2 and AH3, a method for localization by means of field strength measurement of the radio signals of the wheel electronic systems ERH2, ERH3, ELH3 and ELH2 must be used. For the communication, the wheel unit ERH2 transmits a radio signal FRH2 with an individual identifier KRH2 to the antenna AEH2 of the second receiving device EEH2, the wheel electronic system ERH3 transmits radio signals FRH3 with an individual identifier KRH3, the wheel unit ELH2 transmits radio signals FLH2 with an individual identifier KLH2 and the wheel unit ELH3 transmits radio signals FLH3 with an identifier KLH3. It is assumed here that all radio signals are transmitted with the same predefined signal strength or transmitting power S0. It can thus be ensured that the field strengths of the corresponding received signals measured at the location of the antenna AEH2 serve as a measure of a distance from the antenna AEH2 to the individual transmitting wheel electronic systems. The antenna AEH2 is again located asymmetrically in relation to the individual wheels or wheel electronic systems, and is located in the area of the second axle AH2 at a shorter distance from the upper or right wheels than from the lower, left wheels. Thus, on the one hand, the distance AR2 from the right wheel electronic system ERH2 of the second axle AH2 is shorter than the distance AL2 from the left wheel electronic system ELH2 to the antenna AEH2. Furthermore, the distance AR3 from the right wheel electronic system ERH3 is shorter than the distance AL3 from the left wheel electronic system ALH3 to the antenna AEH2. As shown in FIG. 3, the distances from the individual wheel electronic systems to the antenna AEH2 of the second receiving device EEH2 have different values, wherein the distance values are in the following ascending order: AR2, AR3, AL2, AL3. If the antenna AEH2 then receives radio signals at its location which it forwards to the second receiving device EEH2, so that the latter carries out a field strength measurement and either evaluates the corresponding field strength values itself or forwards them to the evaluation device AWE of the control device, the distance to the antenna AEH2 and therefore the place of origin of the radio signal and therefore the installation position of the wheel electronic system or the wheel allocated to the latter can thus be inferred in a simple manner through corresponding field strength measurement. If, for example, a radio signal with a very high field strength is received, this can be interpreted as a radio signal of the wheel electronic system ERH2, since this has the shortest distance to the antenna AEH2. Corresponding field strengths signals or field strength signal ranges which are then allocated to a corresponding installation position of wheels can be allocated accordingly for all installation positions. Through this facility, by means of a single receiving unit (EEH2) which is provided in any case to receive the radio signals with the individual identifiers of the wheel electronic systems, wherein the location of reception by the antenna AEH2 is asymmetrical in relation to all wheels or wheel electronic systems, a reliable localization of the wheels of the rear wheel axles AH3 and AH2 also can thus be carried out in a simple manner with reduced device-related technical outlay.

Figure 4:
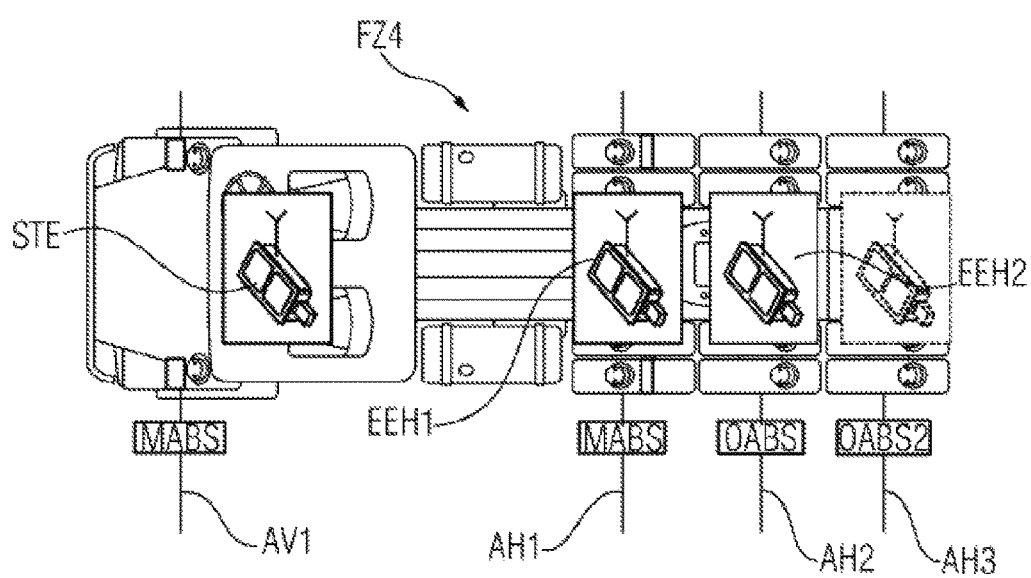
FIG. 4 shows a schematic representation of a motor vehicle in the form of a truck with an arrangement for localizing the installation position of wheels according to a fourth embodiment of the invention.

Reference is now made to FIG. 4 which shows a schematic representation of a vehicle FZ4 in the form of a truck. In the front part of the truck, a (first) front wheel axle AV1 is located in which rotational angle sensors and rotational speed sensors are allocated to the wheels on the vehicle side for the localization of the wheels. A design of this type of the first or front wheel axle is also shown in FIG. 1 in relation to the vehicle FZ1, and for this reason reference is made to FIG. 1 for a precise explanation. The rear part of the vehicle FZ4 corresponds to the rear part of the vehicle FZ3 from FIG. 3, and for this reason reference is made to FIG. 3 for a precise illustration of the set-up and mode of operation. The vehicle FZ4 from FIG. 4 can thus be regarded as a variant of the vehicle FZ3 from FIG. 3, without a second front axle being provided. In the rear part in particular, a precise facility for the localization of wheels has been provided with minimized device-related technical outlay (without rotational angle sensors or rotational speed sensors) in the case of the vehicle FZ4 also.

Figure 5:
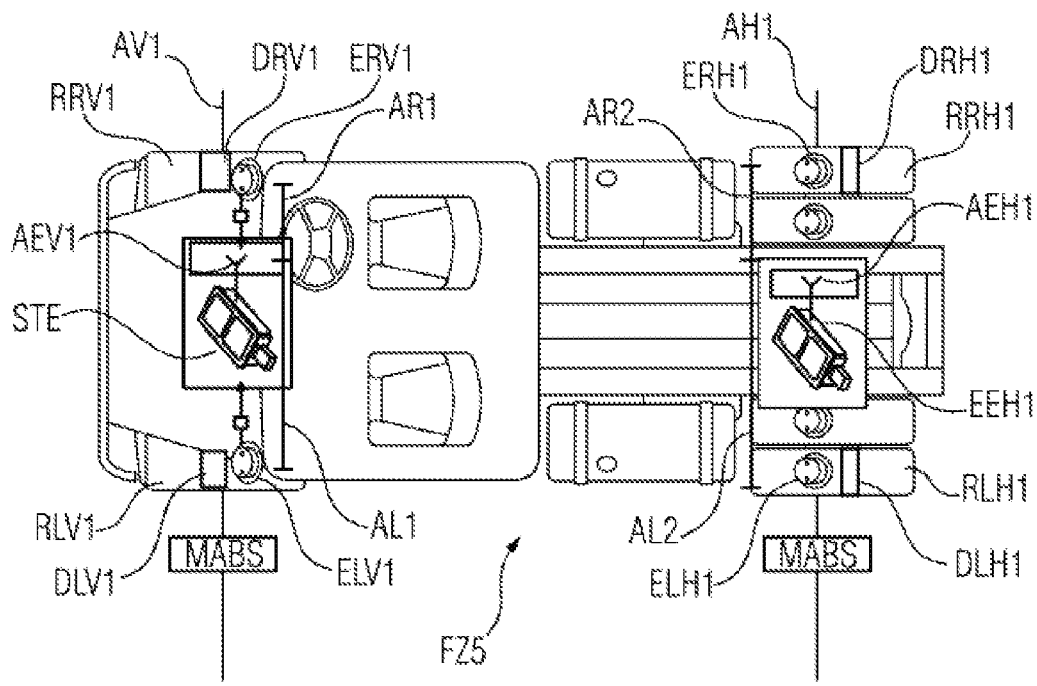
FIG. 5 shows a schematic representation of a motor vehicle in the form of a truck with an arrangement for localizing the installation position of wheels according to a fifth embodiment of the invention.

Reference is now made to FIG. 5 which shows a vehicle FZ5 similarly in the form of a truck with a tire pressure monitoring device or a tire information device according to a fifth embodiment. The vehicle FZ5 has only one (first) front axle AV1, to the wheels RLV1 and RRV1 of which respective rotational angle sensors or rotational speed sensors DLV1 and DRV1 are assigned on the vehicle side. The wheels RLV1 and RRV1 have corresponding wheel electronic systems ELV1 and ERV1 which can emit corresponding radio signals with an individual identifier and rotational angle information, etc., for the communication with the control device STE. A localization of the wheels RLV1 and RRV2 can be carried out here accordingly via a synchronization or matching of the first rotational angle information defined and emitted by the wheel electronic systems ELV1 and ERV1 with the second rotational angle information produced by the rotational angle sensors DLV1 and DRV1.

The vehicle FZ5 furthermore comprises a (first) rear axle AH1 in which the wheels RLH1 and RRH1 have corresponding wheel electronic systems ELH1 and ERH1. A rotational angle sensor DLH1 is furthermore assigned to the wheel RLH1 on the vehicle side, whereas a rotational angle sensor DRH1 is assigned to the wheel RRH1 on the vehicle side. According to the wheels of the front axle, a localization of the wheels RLH1 and RRH1 can also be carried out in this way by means of a synchronization or matching of the first rotational angle information from the wheel electronic systems ELH1 and ERH1 and the second rotational angle information from the rotational angle sensors DLH1 and DRH1. In addition to this, it is now also possible to carry out a localization by means of a field strength measurement of the corresponding emitted radio signals from the wheel electronic systems. As shown in FIG. 5, the antenna AEV1 of the control device STE or its receiving device is arranged, on the one hand asymmetrically in relation to the wheels of the front axle AV1 and is located at a shorter distance from the upper or right wheel RRV1 compared to the left wheel RLV1. The antenna AEH1 of the receiving device EEH1 is accordingly arranged asymmetrically in relation to the wheels of the rear axle AH1 and is located at a shorter a distance from the upper or right wheel RRH1 compared to the left wheel RLH1. Thus, on the one hand, the distance AR1 from the first right wheel electronic system ERV1 to the antenna AEV1 is shorter than the distance AL1 from the first left wheel electronic system ELV1 to the antenna AEV1. The distance AR2 from the second right wheel electronic system EHR1 to the antenna AEH1 is accordingly also shorter than the distance AL2 from the second left wheel electronic system ELH1 to the antenna AEH1. Due to this asymmetrical arrangement of the receiving device or its antenna, the installation position of the wheel electronic systems can be defined in a simple manner by means of a field strength measurement of the corresponding radio signals. If, for example, a radio signal arrives at the antenna AEV1 with a high field strength, this originates with a high probability from the close first right wheel electronic system ERV1 due to the short distance to the latter.

Since the field strength measurement may be adversely affected during the practical operation of the vehicle FZ5 due to structural characteristics on the truck or a multipath propagation of the radio signals from the wheel electronic systems to the corresponding receiving devices, but also since a corresponding synchronization or matching of the first rotational angle information with the second rotational angle information does not always deliver unambiguous results, the robustness of a localization algorithm can be improved by a combination of the two localization methods. It is possible, for example, initially to perform a localization of the wheels on the basis of the data from the rotational angle sensors and, if the results are not unambiguous, to additionally include the results of the localization of the field strength measurement. It is also possible initially to carry out a field strength measurement and use the information from the wheel rotational speed sensors to confirm the result.

The invention claimed is:

1. A method for localizing the installation position of wheels of a vehicle, the method comprising the following steps:
   providing the vehicle with at least one first wheel and a second wheel and a third wheel, wheel electronic systems each being allocated to a respective one of the wheels to emit a radio signal with an individual identifier, and a vehicle-side rotational angle sensor allocated to a first possible installation position;
   defining an installation position of the at least one first wheel via information sensed by the rotational angle sensor at the first possible installation position;
   measuring a field strength of the radio signals with the individual identifiers of the wheel electronic systems of the at least one second and third wheel by using a vehicle-side receiving device; and
   determining the installation position of the at least one second and third wheel based on the respectively measured field strength, as a measure of a distance from the vehicle-side receiving device to the wheel electronic system of the at least one second and third wheel, wherein neither angular positions nor rotational speeds of the at least one second and third wheel are taken into account to determine the installation position of the at least one second and third wheel.

2. The method as claimed in claim 1, which further comprises initially defining the individual identifier of the wheel at the first possible installation position of the rotational angle sensor, and subsequently determining the installation positions of the wheels not yet localized by using field strength measurement.

3. The method as claimed in claim 1, wherein the vehicle-side receiving device is disposed asymmetrically in terms of distance in relation to the at least one second and third wheel.

4. The method as claimed in claim 1, wherein the at least one first wheel is disposed on a first wheel axle of the motor vehicle and the at least one second and third wheels are disposed on a second wheel axle of the motor vehicle.

5. The method as claimed in claim 1, which further comprises emitting the radio signal with a predefined transmitting power.

6. An arrangement for localizing the installation position of wheels of a motor vehicle, the arrangement comprising:
   at least one vehicle-side rotational angle sensor for placement in a first possible installation position;
   wheel electronic systems each being allocated to at least one first wheel and at least one second and third wheel and being configured to emit a radio signal with an individual identifier;
   a vehicle-side receiving device for receiving the radio signals; and
   a vehicle-side evaluation device being configured:
   to define the installation position of the at least one first wheel via information from the rotational angle sensor in the first possible installation position; and
   to determine the installation position of the at least one second and third wheel by measuring a field strength of the radio signals with the individual identifiers of the wheel electronic systems of the at least one second and third wheel at the location of the vehicle-side receiving device, wherein neither angular positions nor rotational speeds of the at least one second and third wheel are taken into account to determine the installation position of the at least one second and third wheel.

7. The arrangement as claimed in claim 6, wherein the evaluation device has a memory for storing all individual identifiers received via the radio signals and a corresponding allocation to the possible installation positions of the allocated wheels.

8. A control device for an arrangement for localizing the installation position of wheels of a motor vehicle, the control device comprising:
   a first input for receiving information sensed by a vehicle-side rotational angle sensor for placement in a first possible installation position;
   a second input for receiving radio signals emitted with an individual identifier by wheel electronic systems each being allocated to at least one first wheel and at least one second and third wheel; and
   an evaluation device being configured:
   to define the installation position of the at least one first wheel via the information sensed by the rotational angle sensor at the first possible installation position; and
   to determine the installation position of the at least one second and third wheel by measuring a field strength of the radio signals with the individual identifiers of the wheel electronic systems of the at least one second and third wheel at the location of the vehicle-side receiving device, wherein neither angular positions nor rotational speeds of the at least one second and third wheel are taken into account to determine the installation position of the at least one second and third wheel.

9. A motor vehicle, comprising:
at least one first and at least one second and third wheel; and
an arrangement for localizing the installation position of the wheels of the motor vehicle according to claim 6.

10. A non-transitory computer-readable medium with instructions stored thereon, that when executed by a processor in a vehicle having:
at least one first wheel and a second wheel and a third wheel, wheel electronic systems each being allocated to a respective one of the wheels to emit a radio signal with an individual identifier, and a vehicle-side rotational angle sensor allocated to a first possible installation position,
performs the following steps for localizing the installation position of the wheels of the vehicle comprising:
defining the installation position of the at least one first wheel via information sensed by the rotational angle sensor at the first possible installation position;
measuring a field strength of the radio signals with the individual identifiers of the wheel electronic systems of the at least one second and third wheel by using a vehicle-side receiving device; and
determining the respective installation position of the at least one second and third wheel from a respectively measured field strength, as a measure of a distance from the vehicle-side receiving device to the wheel electronic system of the at least one second and third wheel, wherein neither angular positions nor rotational speeds of the at least one second and third wheel are taken into account to determine the installation position of the at least one second and third wheel.

11. The non-transitory computer-readable medium according to claim 10, wherein the processor is the control device according to claim 8.

\* \* \* \* \*